United States Patent
Stervik

(10) Patent No.: US 7,276,015 B2
(45) Date of Patent: Oct. 2, 2007

(54) DEVICE FOR ENGINE-DRIVEN GOODS VEHICLE

(75) Inventor: Hans Stervik, Karna (SE)

(73) Assignee: Volvo Lastvagnar AB, Gothenburg (SE)

( * ) Notice: Subject to any disclaimer, the term of this patent is extended or adjusted under 35 U.S.C. 154(b) by 220 days.

(21) Appl. No.: 10/711,059

(22) Filed: Aug. 19, 2004

(65) Prior Publication Data

US 2005/0029034 A1   Feb. 10, 2005

Related U.S. Application Data

(63) Continuation of application No. PCT/SE03/00240, filed on Feb. 12, 2003.

(30) Foreign Application Priority Data

Feb. 19, 2002 (SE) ..................... 0200491

(51) Int. Cl.
  *B60W 10/04* (2006.01)
  *B60W 10/10* (2006.01)
  *G06F 7/00* (2006.01)
  *G06F 17/00* (2006.01)

(52) U.S. Cl. .................. 477/110; 477/35; 701/88; 701/90

(58) Field of Classification Search ................. 477/110, 477/35, 36; 701/84, 85, 88, 90
  See application file for complete search history.

(56) References Cited

U.S. PATENT DOCUMENTS

| 4,347,760 A | 9/1982 | Jewett |
| 4,549,448 A | 10/1985 | Kittle |
| 4,589,511 A * | 5/1986 | Leiber ..................... 180/197 |
| 4,671,373 A | 6/1987 | Sigl |
| 4,765,430 A * | 8/1988 | Schulze et al. ............. 180/197 |
| 4,819,511 A | 4/1989 | Deike |
| 4,872,372 A * | 10/1989 | Bantle et al. ................ 475/150 |
| 5,220,975 A * | 6/1993 | Zimmer et al. ............. 180/197 |
| 5,269,390 A * | 12/1993 | Glover et al. ............... 180/197 |
| 5,289,895 A * | 3/1994 | Takata et al. ............... 180/248 |
| 6,493,622 B1 * | 12/2002 | Erban ........................... 701/84 |
| 6,584,398 B1 * | 6/2003 | Erban ........................... 701/82 |
| 6,904,991 B2 * | 6/2005 | Barth et al. ................. 180/197 |
| 6,976,553 B1 * | 12/2005 | Dahl et al. .................. 180/247 |

FOREIGN PATENT DOCUMENTS

| JP | 2005306273 A * | 11/2005 |
| WO | WO 9301065 | 1/1993 |

* cited by examiner

*Primary Examiner*—Tisha Lewis
(74) *Attorney, Agent, or Firm*—Novak Druce & Quigg, LLP

(57) ABSTRACT

Method and device for providing, in an engine-driven goods vehicle, at least two driving wheels (9, 10, 51, 52) and at least one differential (5, 6, 45, 46, 47) arranged between the driving wheels (9, 10, 51, 52). The device includes an engine control unit (3), at least one differential lock (7, 8, 48, 49, 50) for locking or braking the differential (5, 6, 45, 46, 47), the differential lock (7, 8, 48, 49, 50) being arranged between the driving wheels (9, 10, 51, 52). An operating element (4, 44) for activating each of the differential locks (7, 8, 48, 49, 50). The engine control unit (3) being configured to read-off the position of the operating element (4, 44) and to limit positive or negative output torques of the engine (1) when activating at least one of the differential locks (7, 8, 48, 49, 50) and as a function of the transmission ratio prevailing in the transmission (2, 42).

5 Claims, 2 Drawing Sheets

DEVICE FOR ENGINE-DRIVEN GOODS VEHICLE

CROSS-REFERENCE TO RELATED APPLICATIONS:

The present application is a continuation patent application of International Application No. PCT/SE03/00240 filed 12 Feb. 2003 which was published in English pursuant to Article 21(2) of the Patent Cooperation Treaty, and which claims priority to Swedish Application No. 0200491-9 filed 19 Feb. 2002. Said applications are expressly incorporated herein by reference in their entireties.

TECHNICAL FIELD

The present invention relates to a device for controlling the engine output torque in goods (cargo) vehicles equipped with differential locks.

BACKGROUND ART

The function of a differential in a vehicle is to adjust (accommodate) for different speeds between driven wheels, and also to maintain total motive force; that is, ensure an even (or otherwise desired) torque distribution over all driven wheels. This is necessary because when cornering in a vehicle, the outer wheels have a greater distance to travel compared to the inner wheels. Driving rear axles for goods vehicles are normally equipped with a differential lock that allows the vehicle drive shafts to be coupled together. When the differential lock is engaged thereby causing a blocking of the action of the differential between the driving wheels, the driving wheels are controlled to rotate at the same speed; that is to say, without equal torque distribution and producing a condition that increases wheel (tire) adhesion when the underlying surface is smooth and slippery. The differential between two driving wheels (in a pair of driving wheels) will henceforward be referred to as the wheel differential.

On vehicles equipped with two or more driving wheel pairs (that is to say four-wheel drive, six-wheel drive, and the like), differentials with differential locks may be arranged between such paired driving wheels. The differential between a two driving wheel pair will henceforward be referred to as the axle differential.

When one or more differential locks are activated for axle or wheel differentials, there is a risk of an unequal distribution of the torque between the drive shafts in a driving wheel pair or between respective driving wheel pairs. In the event of high positive or negative torques from the engine of the vehicle and high transmission ratios between the engine and the driving wheels (that is to say, when low gear is selected), drive shafts, differentials and their constituent components may be overloaded if the torque distribution is too unequal. Many drivers of goods vehicles know that it is necessary to exercise caution when increasing the torque in certain situations. Inexperienced drivers, however, run the risk of expensive damage to axle and differential components.

Known solutions include driver training courses and the use of driver manuals which both have as a goal to assure that driver can handle the vehicle correctly. Another solution is to equip these certain prone vehicles with an over-dimensioned shafts and/or differentials which can be quite expensive.

There is therefore a need to eliminate the risk of damage to the vehicle drive train (for example, rear axles, differentials, propshafts, wheel suspension etc.) when activating differential locks. This is the prime object of the invention described below.

DISCLOSURE

Device(s) configured according to the presently disclosed invention(s) for an engine-driven goods vehicle includes at least two driving wheels and at least one differential arranged between those driving wheels. The actual device, according to at least one embodiment of the invention, comprises (includes, but is not necessarily limited to) a control means including an engine control unit, at least one differential lock for locking or braking the differential and which is arranged between the driving wheels or between two driving wheel pairs, and an operating element for activation of each differential lock. The engine control unit is designed to read off the position of the operating element and to limit positive or negative engine output torques when activating at least one of the said differential locks.

A main advantage of device(s) configured according to the invention lies in the fact that it is possible to use the maximum applied torque permitted in the situation, and that the risk of any damage to shafts and differentials is eliminated. A further advantage for the driver relates to handling the vehicle; he or she no longer needs to pay attention to whether differential locks are activated. The driver does not need to be as careful about increasing the torque. The service life of drive pinion units and drive shafts is markedly increased.

According to an advantageous first embodiment of the device according to the invention, the engine control system limits positive or negative engine output torques depending on which differential locks are activated, on the engine speed and on the transmission ratio prevailing in a transmission arranged between the engine and the driving wheels.

An advantage of this configuration is that it makes it possible to control the engine torque more precisely and thereby to use the maximum permitted torque from the engine in a certain situation.

DESCRIPTION OF DRAWINGS

The present invention will be described in greater detail below with reference to the accompanying drawings which show, by way of example, further preferred embodiments of the invention and the technical background.

MODE FOR INVENTION

Figure 1:
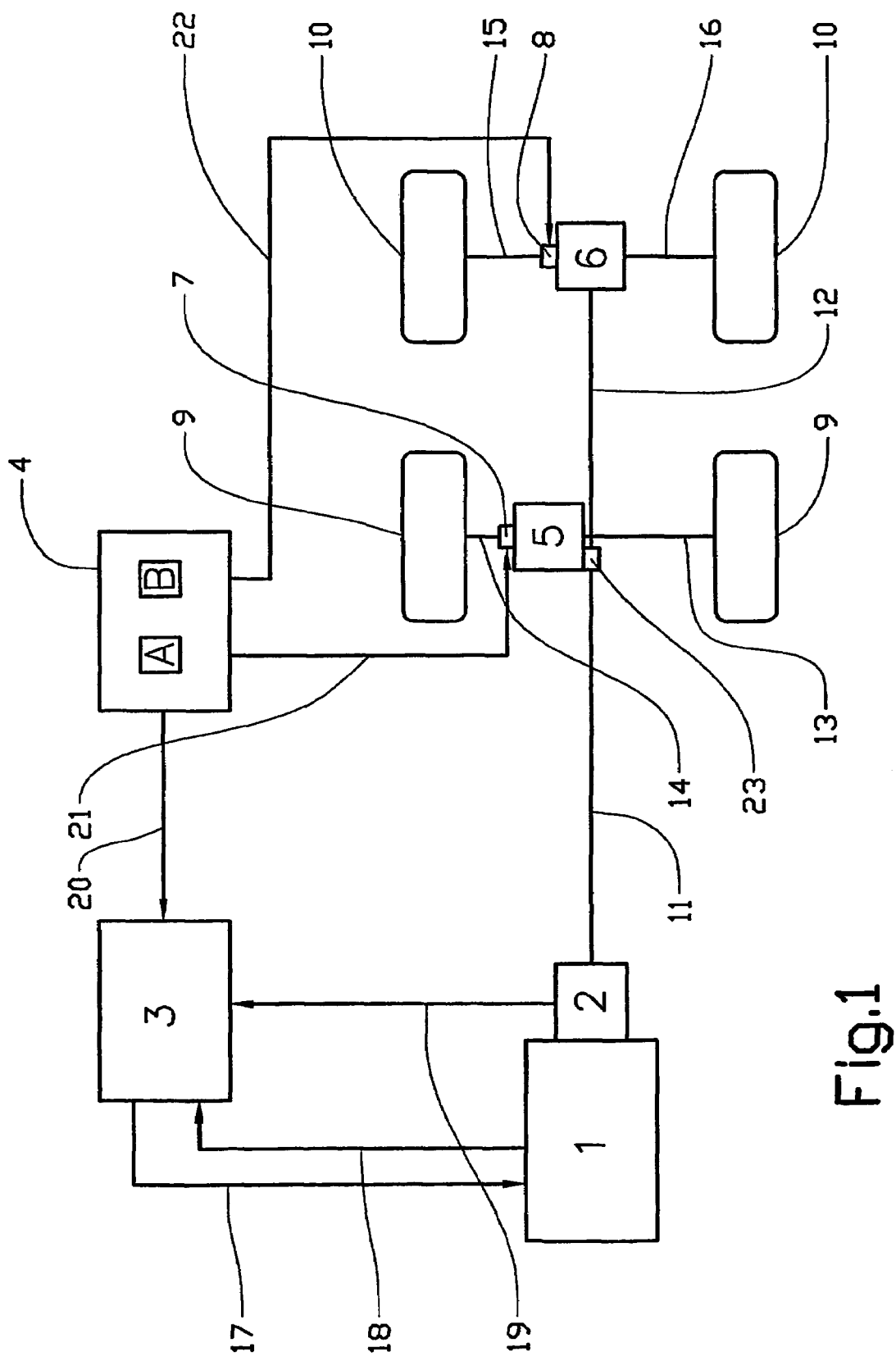
FIG. 1 is a schematic view diagrammatically illustrating an embodiment of the invention in which a vehicle is provided with two driving wheel pairs and two differential locks.

FIG. 1 shows an embodiment of the invention in which a vehicle has two driving wheel pairs 9 and 10. The driving wheels 9 are driven by an engine 1 via a gearbox 2, which is coupled to a propshaft 11, and from the propshaft 11, via a toothed gearing 23, a crown wheel (not shown) is driven in a wheel differential 5, which is in turn coupled to each of the driving wheels 9 via drive shafts 13 and 14, respectively. A differential lock 7 for blocking the differential function of the.wheel differential 5 is arranged on the drive shaft 14.

The driving wheels 10 are also driven by the engine 1 via the gearbox 2 and the propshaft 11. However, a second wheel differential 6 is instead driven via a shaft 12, which is an extension of the propshaft 11. The shaft 12 drives a crown wheel (not shown) in the second wheel differential 6, which is in turn coupled to each of the driving wheels 10 via drive shafts 15 and 16 respectively. A second differential lock 8 for blocking the differential function of the second wheel differential 6 is arranged on the drive shaft 15.

Each differential lock 7 and 8 is activated or deactivated in a known manner by an operating element 4 via line 21 and 22, respectively. The operating element 4 is preferably equipped with two switches A and B for activation of the respective differential lock 7, 8.

Positive or negative output torques of the engine 1 are controlled in a known manner by an engine control system 3 via a line 17, the engine control system 3 receiving information on the required torque preferably from the vehicle's accelerator pedal (not shown) or cruise control (not shown). The engine control system 3 receives information on the speed of the engine 1 via the line 18, information on the gear engaged in the gearbox 3 via the line 19 and information on which differential locks 7, 8 are activated via the line 20.

Information on the maximum permitted positive or negative torque output form the engine 1 when either of the differential locks 7 or 8 is activated, or both differential locks 7 and 8 are activated is stored in the engine control system 3. From the information over the line 20 concerning which differential locks 7 and/or 8 are activated and from the stored information on the maximum permitted torque, the engine control system 3 determines the maximum permitted torque which the engine 1 may deliver.

In the exemplary embodiment configured according to FIG. 1, the engine control system 3 is also supplied with information on the speed of the engine 1 and the gear selected in the gearbox 3. The remaining transmission ratios in the rest of the vehicle's transmission system are known and therefore the overall transmission ratio between the engine 1 and the driving wheels 9, 10 is known. Thus the information stored in the engine control system 3 is supplemented by tables which define the maximum permitted engine output torque as a function of the engine speed, gear engaged and which differential locks are activated.

The content of the said tables is determined through calculations, analyses and tests in a laboratory environment.

Figure 2:
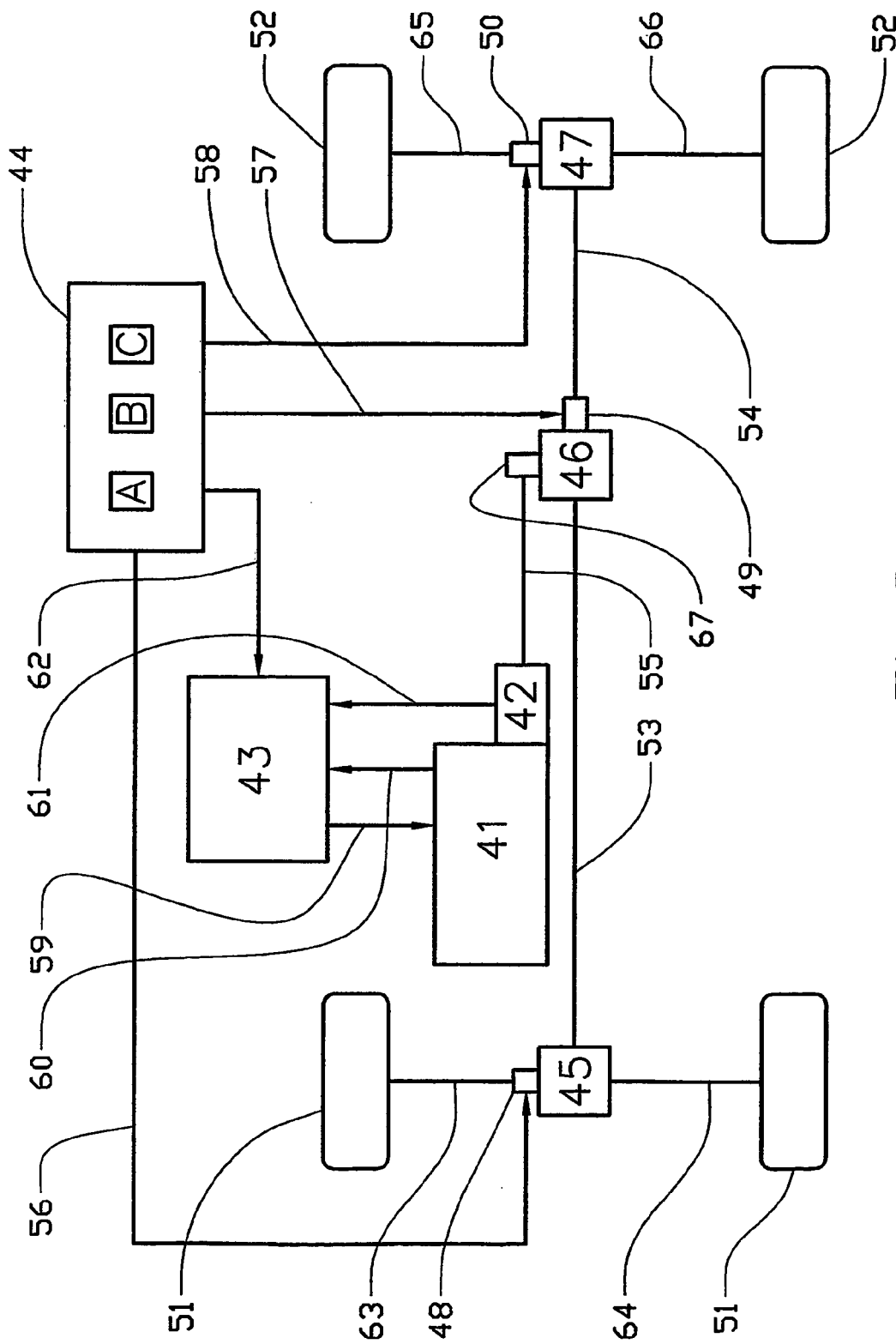
FIG. 2 is a schematic view diagrammatically illustrating an embodiment of the invention in which a vehicle is provided with two driving wheel pairs and three differential locks.

FIG. 2 shows, in diagrammatic form, an embodiment of the invention in which a vehicle also has two driving wheel pairs 51 and 52. The driving wheel pairs 51 and 52, however, are in this case each driven not only via their own wheel differential 45 and 47, but also via an axle differential 46. The crown wheel (not shown) of the axle differential 46 is driven from an engine 41 via a gear 67, a shaft 55 and a gearbox 42. The axle differential 46 distributes torque from the engine 41 to each driving wheel pair 51, 52 via propshafts 53 and 54, respectively.

The propshaft 53 drives a crown wheel (not shown) in a first wheel differential 45, which is in turn coupled to each of the driving wheels 51 via drive shafts 63 and 64, respectively. A first differential lock 48 for blocking the differential function of the first wheel differential 45 is arranged on the drive shaft 63.

In the same way the propshaft 54 drives a crown wheel (not shown) in a second wheel differential 47, which is in turn coupled to each of the driving wheels 52 via drive shafts 65 and 66 respectively. A second differential lock 50 for blocking the differential function of the second wheel differential 47 is arranged on the drive shaft 65.

As in the exemplary embodiment of the invention configured according to FIG. 1, an engine control system 43 is supplied and which includes information on the speed of the engine 41, via the line 60, on the gear selected in the gearbox 42 via the line 61 and on which differential locks 48, 49, 50 are engaged via the line 62. The line 62 is coupled to an operating element 44 for operation of each differential lock 48, 49, 50 via lines 56, 57, 58 respectively. The remaining transmission ratios in the rest of the vehicle's transmission system are known and therefore the overall transmission ratio between the engine 41 and the driving wheels 51, 52 is known. The information is stored in the engine control system 43 in the form of tables of the maximum permitted output torque from the engine 41, which varies as a function of the speed of the engine 41, the gear selected and which of the three differential locks 48, 49, 50 are activated.

The differential locks 7, 8, 48, 49, 50 may be of locking type (claw coupling, for example) or of braking type (disk clutch, for example).

The driver of the vehicle may also be given the facility for also actively overriding the torque limit set by the device according to the invention.

Each differential lock 7, 8, 48, 49, 50 can also be activated by means of an automatic control (not shown) which detects whether any of the driving wheels of the vehicle is slipping.

Certain vehicles may be equipped with a final drive unit out on each driving wheel. In such vehicles, account must also be taken of the gearing selected for the final drive unit in order to obtain the correct transmission ratio between engine and driving wheel.

The lines 21, 22, 56, 57 and 58 for controlling each differential lock 7, 8, 48, 49 and 50, respectively, may be of known pneumatic, hydraulic, electrical or similar type.

Other lines or information channels (conveyors) in embodiments described above are preferably of the electrical lead or optical cable type. Wireless transmission of information is also possible. The information channels may in turn form part of the vehicle data bus system. However, devices configured according to the teachings of the presently disclosed invention should be understood to not be limited to such examples of signaled transmission arrangements.

The invention claimed is:

1. An arrangement in an engine-driven goods vehicle comprising:

an engine drivingly associated with paired sets of drive wheels (9, 10 and 51, 52);

a differential (5, 6, 45, 46, 47) arranged between the paired drive wheels (9, 10 and 51, 52) of a set and including differential locks (7, 8, 48, 49, 50) for locking and braking respective differentials (5, 6, 45, 46, 47); and a control unit (3) configured to control the engine and the differential lock (7, 8, 48, 49, 50) and reduce positive and negative output torque of the engine (1) to a maximum allowable torque level, after having receiving an input signal indicating that at least one differential lock (7, 8, 48, 49, 50) is activated wherein said drive wheels comprise at least two paired sets of drive wheels (9, 10, 51, 52), each set having a differential (5, 6, 45, 46, 47) and a differential lock (7, 8, 48, 49, 50) associated therewith, wherein the control unit (3) limits positive and negative output torques of the engine (1) to a maximum allowable level dependent upon which differential locks (7, 8, 48, 49, 50) are activated.

2. An arrangement in an engine-driven goods vehicle comprising:

an engine drivingly associated with paired sets of drive wheels (9, 10 and 51, 52);

a differential (5, 6, 45, 46, 47) arranged between the paired drive wheels (9, 10 and 51, 52) of a set and including differential locks (7, 8, 48, 49, 50) for locking and braking respective differentials (5, 6, 45, 46, 47); and a control unit (3) configured to control the engine and the differential lock (7, 8, 48, 49, 50) and reduce positive and negative output torque of the engine (1) to a maximum allowable torque level, after having receiving an input signal indicating that at least one differential lock (7, 8, 48, 49, 50) is activated, wherein said control unit (3) limits positive and negative output torques of the engine (1) to a maximum allowable level, which level depends on which transmission ratio is selected in a transmission (2, 42) arranged between the engine (1) and the drive wheels (9, 10, 51, 52).

3. The arrangement as recited in claim 1, wherein said control unit (3) limits positive and negative output torques of the engine (1) exclusively when high transmission ratios are engaged.

4. An arrangement in an engine-driven goods vehicle comprising:

an engine drivingly associated with paired sets of drive wheels (9,10 and 51, 52);

a differential (5, 6, 45, 46, 47) arranged between the paired drive wheels (9, 10 and 51, 52) of a set and including differential locks (7, 8, 48, 49, 50) for locking and braking respective differentials (5, 6, 45, 46, 47); and a control means for controlling the engine and the differential lock (7, 8, 48, 49, 50) and including a control unit (3) for reducing positive and negative output torque of the engine (1) to a maximum allowable torque level, after receiving an input signal indicating that at least one differential lock (7, 8, 48, 49, 50) is activated, wherein said drive wheels comprise at least two paired sets of drive wheels (9, 10, 51, 52), each set having a differential (5, 6, 45, 46, 47) and a differential lock (7, 8, 48, 49, 50) associated therewith, wherein the control unit (3) limits positive and negative output torques of the engine (1) to a maximum allowable level dependent upon which differential locks (7, 8, 48, 49, 50) are activated.

5. An arrangement in an engine-driven goods vehicle comprising:

an engine drivingly associated with paired sets of drive wheels (9, 10 and 51, 52);

a differential (5, 6, 45, 46, 47) arranged between the paired drive wheels (9, 10 and 51, 52) of a set and including differential locks (7, 8, 48, 49, 50) for locking and braking respective differentials (5, 6, 45, 46, 47); and a control means for controlling the engine and the differential lock (7, 8, 48, 49, 50) and including a control unit (3) for reducing positive and negative output torque of the engine (1) to a maximum allowable torque level, after receiving an input signal indicating that at least one differential lock (7, 8, 48, 49, 50) is activated, wherein said control unit (3) limits positive and negative output torques of the engine (1) to a maximum allowable level, which level depends on which transmission ratio is selected in a transmission (2, 42) arranged between the engine (1) and the drive wheels (9, 10, 51, 52).

\* \* \* \* \*